United States Patent
Xue et al.

(10) Patent No.: US 11,734,392 B2
(45) Date of Patent: Aug. 22, 2023

(54) ACTIVE INTERACTION METHOD, ELECTRONIC DEVICE AND READABLE STORAGE MEDIUM

(71) Applicant: Beijing Baidu Netcom Science and Technology Co., Ltd., Beijing (CN)

(72) Inventors: Yang Xue, Beijing (CN); Fan Wang, Beijing (CN); Jingzhou He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 351 days.

(21) Appl. No.: 17/237,978

(22) Filed: Apr. 22, 2021

(65) Prior Publication Data
US 2022/0019847 A1    Jan. 20, 2022

(30) Foreign Application Priority Data
Jul. 20, 2020 (CN) .......................... 202010700592.3

(51) Int. Cl.
*G06F 18/40* (2023.01)
*G06T 7/246* (2017.01)
(Continued)

(52) U.S. Cl.
CPC .......... *G06F 18/40* (2023.01); *G06F 18/2132* (2023.01); *G06F 18/253* (2023.01);
(Continued)

(58) Field of Classification Search
CPC .... G06F 18/40; G06F 18/2132; G06F 18/253; G06F 18/30; G06T 7/251; G06T 2207/20084; G06V 20/46
See application file for complete search history.

(56) References Cited

U.S. PATENT DOCUMENTS

| 2013/0113877 A1* | 5/2013 | Sukthankar | G06V 20/46 348/E13.001 |
| 2013/0158707 A1* | 6/2013 | Lee | G06N 5/02 901/46 |

(Continued)

FOREIGN PATENT DOCUMENTS

| CN | 106537293 A | 3/2017 |
| JP | 2019185230 A | 10/2019 |

(Continued)

OTHER PUBLICATIONS

European Search Report, Application No. EP21170233.7, dated Oct. 7, 2021, 8 pages.

(Continued)

*Primary Examiner* — Casey L Kretzer
(74) *Attorney, Agent, or Firm* — Kwan & Olynick LLP (57) ABSTRACT

An active interaction method, an electronic device and a readable storage medium, relating to the field of deep learning and image processing technologies, are disclosed. According to an embodiment, the active interaction method includes: acquiring a video shot in real time; extracting a visual target from each image frame of the video, and generating a first feature vector of each visual target; for each image frame of the video, fusing the first feature vector of each visual target and identification information of the image frame to which the visual target belongs to generate a second feature vector of each visual target; aggregating the second feature vectors with the same identification information respectively to generate a third feature vector corresponding to each image frame; and initiating active interaction in response to determining that the active interaction is to be performed according to the third feature vector of a preset image frame.

20 Claims, 3 Drawing Sheets

(51) Int. Cl.
*G06F 40/30* (2020.01)
*G06V 20/40* (2022.01)
*G06F 18/25* (2023.01)
*G06F 18/2132* (2023.01)

(52) U.S. Cl.
CPC .............. *G06F 40/30* (2020.01); *G06T 7/251* (2017.01); *G06V 20/46* (2022.01); *G06T 2207/20084* (2013.01)

(56) References Cited

U.S. PATENT DOCUMENTS

| | | |
|---|---|---|
| 2013/0294642 A1 | 11/2013 | Wang et al. |
| 2019/0354766 A1* | 11/2019 | Moore .................. G06V 20/49 |
| 2020/0143171 A1 | 5/2020 | Lee et al. |

FOREIGN PATENT DOCUMENTS

| | | |
|---|---|---|
| JP | 2019200551 A | 11/2019 |
| WO | 2016167331 A1 | 10/2016 |
| WO | 2019191383 A1 | 10/2019 |
| WO | 2019226948 A1 | 11/2019 |
| WO | 2019235067 A1 | 12/2019 |

OTHER PUBLICATIONS

An Illustrated Guide to Deep Learning, Nov. 19, 2018, 14 pgs.
First Office Action for JP2021-118327, dated Oct. 22, 2022, 3 pgs.
First Office Action for KR10-2021-0087893, dated Dec. 12, 2022, 5 pgs.
English Translation_Development of a humanoid-type social robot based on autonomous behavior and learning with various interaction contents', Research Institutes: TOROOC Inc., Research manager: Jeon, Dong-Su, Managing department: Ministry of Trade, Industry and Energy, Title of project: Enhancement of design innovation capabilites (Sep. 30, 2017), 15 pgs.
Korean Version_Development of a humanoid-type social robot based on autonomous behavior and learning with various interaction contents', Research Institutes: TOROOC Inc., Research manager: Jeon, Dong-Su, Managing department: Ministry of Trade, Industry and Energy, Title of project: Enhancement of design innovation capabilites (Sep. 30, 2017), 99 pgs.
Notice of Allowance for KR10-2021-0087893, dated Jun. 27, 2023, 6 pgs.

* cited by examiner

ACTIVE INTERACTION METHOD, ELECTRONIC DEVICE AND READABLE STORAGE MEDIUM

The present disclosure claims the priority and benefit of Chinese Patent Application No. 202010700592.3, filed on Jul. 20, 2020, entitled "ACTIVE INTERACTION METHOD AND APPARATUS, ELECTRONIC DEVICE AND READABLE STORAGE MEDIUM". The disclosure of the above application is incorporated herein by reference in its entirety.

TECHNICAL FIELD

The present disclosure relates to the technical field of artificial intelligence, particularly to the field of image processing technologies, and more particularly to a method, an electronic device and a readable storage medium.

BACKGROUND

Traditional active interaction has an existing solution of using methods, such as human body detection, human face detection, or the like, to trigger simple interaction logic according to preset rules, so as to realize active interaction.

Although the existing solution may integrate some human-human interaction criteria in sociology as the rules, due to the limitation of the single latitude of a perceived signal and difficulty in setting complex rules, feedback is unable to be performed for various interaction intentions in actual complex scenarios, and only simple greetings may be made. Especially for a multi-person scenario, an interaction object which is most obvious is difficult to find with a rule-driven method, which may cause the conditions of disturbing pedestrians by mistake, or the like, and therefore, the active interaction has low accuracy and intelligence.

SUMMARY

According to an embodiment of the present disclosure to solve the technical problem, there is provided an active interaction method, including: acquiring a video shot in real time; extracting a visual target from each image frame of the video, and generating a first feature vector of each visual target; for each image frame of the video, fusing the first feature vector of each visual target and identification information of the image frame to which the visual target belongs to generate a second feature vector of each visual target; aggregating the second feature vectors with the same identification information respectively to generate a third feature vector corresponding to each image frame; and initiating active interaction in response to determining that the active interaction is to be performed according to the third feature vector of a preset image frame.

An electronic device includes: at least one processor; and a memory connected with the at least one processor communicatively, and the memory stores instructions executable by the at least one processor to enable the at least one processor to carry out the above-mentioned method.

There is provided a non-transitory computer readable storage medium including instructions, which, when executed by a computer, cause the computer to carry out the above-mentioned method.

BRIEF DESCRIPTION OF THE DRAWINGS

The drawings are used for better understanding the present solution and do not constitute a limitation of the present disclosure. In the drawings.

DETAILED DESCRIPTION OF EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Figure 1:
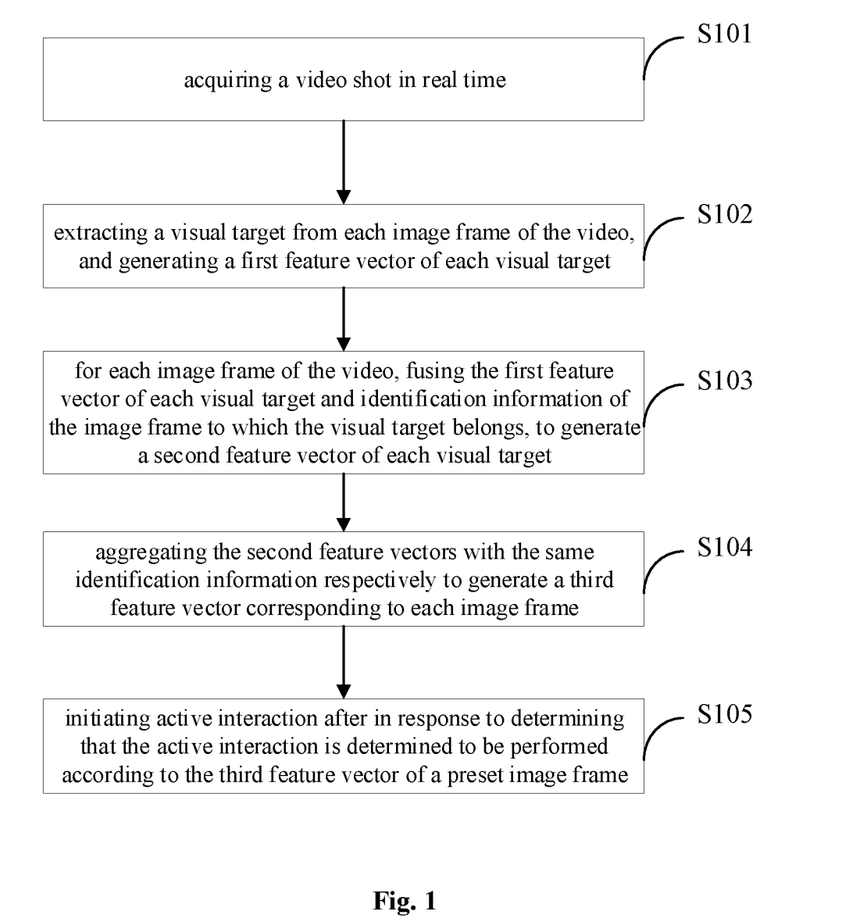
FIG. 1 is a schematic diagram according to a first embodiment of the present disclosure.

FIG. 1 is a schematic diagram according to a first embodiment of the present disclosure. As shown in FIG. 1, an active interaction method according to this embodiment may include the following steps:

S101: acquiring a video shot in real time;

S102: extracting a visual target from each image frame of the video, and generating a first feature vector of each visual target;

S103: for each image frame of the video, fusing the first feature vector of each visual target and identification information of the image frame to which the visual target belongs, to generate a second feature vector of each visual target;

S104: aggregating the second feature vectors with the same identification information respectively to generate a third feature vector corresponding to each image frame; and S105: initiating active interaction in response to determining that the active interaction is to be performed according to the third feature vector of a preset image frame.

An intelligent robot, for example, serves as a subject for executing the active interaction method according to this embodiment. An interaction intention of the interaction object is fully analyzed by analyzing visual information of the interaction object and performing a spatial-temporal modeling operation on the interaction object, thus improving the intelligence and accuracy of the active interaction.

In this embodiment, during execution of S101 of acquiring the video shot in real time, the intelligent robot may acquire the video shot in real time by a camera carried by the intelligent robot, or by another camera.

In this embodiment, S102 of extracting the visual targets from the image frames contained in the video and generating the first feature vector corresponding to each visual target is performed after the execution of S101 of acquiring the video shot in real time. In this embodiment, the visual targets extracted from the image frames in S102 are specific targets in the image frames, and include a person, a backpack, a luggage case and a mobile phone in the image frames.

For example, a real receptionist may determine whether a person is an employee in a building or a visitor to the building according to the visual information, such as the type of a backpack of the person and whether the person has a luggage case; and the mobile phone tends to be able to reflect the state of the person, such as a state of contacting a communication person in a hurry, or a state of taking a picture of the robot, or the like. Therefore, in this embodiment, the above-mentioned target which may affect the active interaction is taken as the specific target, such that only the specific target in the image frame is extracted by S102, thereby avoiding extracting an unrelated visual target, and further improving the accuracy of the active interaction of the intelligent robot.

It is to be understood that, in order to reduce the complexity of a calculation process, in this embodiment, during the execution of S102 of extracting the visual target from each image frame of the video, the number of the extracted visual targets may be set, for example, two visual targets are extracted from each image frame.

Specifically, in this embodiment, when S102 of extracting the visual target from each image frame of the video and generating the first feature vector of each visual target is performed, an employed optional implementation may include: annotating the visual target according to a feature map of each image frame, for example, obtaining a feature map with a size of 13×13×512 using a convolutional neural network CSPDarknet53, and then annotating a boundary box of the visual target in the image frame using a target detection model based on an SPP+YOLO Head structure; extracting a feature-map sub-region corresponding to the visual target from the feature map, and converting the feature-map sub-region into a sub-feature-map with the same size, for example, extracting the feature-map sub-region in corresponding receptive field from the feature map with an ROI Align technology, and converting the feature-map sub-region with different size into a sub-feature-map with the size of 5×5×512 using interpolation or downsampling; after a Global Average Pooling (GAP) operation is performed on each sub-feature-map, obtaining the first feature vector corresponding to each visual target, for example, a 512-dimensional feature vector representing visual target information. When there are two or more visual targets in an image frame, each of the visual targets is annotated and converted to the same size, for example.

After a picture region of the visual target is represented as the sub-feature-map, position and size information of the visual target in the image frame may be lost. Therefore, in order to avoid the loss of the above-mentioned information, during the execution of S102 of generating the first feature vector of each visual target, the method according to this embodiment may further include: for each visual target, determining its coordinates at the upper left corner (Xmin, Ymin) and its coordinates at the lower right corner (Xmax, Ymax) in the image frame in a two-dimensional coordinate system with a center of the image frame as an origin; after a plurality of points are selected from the range [Xmin, Xmax] and [Ymin, Ymax] corresponding to each visual target in the image frame, establishing positional representation of each visual target in a two-dimensional plane, for example, uniformly extracting 5 points (corresponding to the size of the sub-feature-map of the visual target) in each range, so as to establish a position matrix of 5×5×2 of the two-dimensional plane; flattening the established positional representation into a position feature vector with a preset number of dimensions, for example, flattening the positional representation into a feature vector with 50 dimensions using a Flatten function, as position characterization of the visual target in the image frame for representing the position and size information of visual features relative to the center of the image frame; and splicing the obtained position feature vector with the first feature vector of the visual target, for example, splicing the 512-dimensional first feature vector obtained from the feature map with the 50-dimensional position feature vector to obtain a 562-dimensional feature vector corresponding to the visual target.

In this embodiment, S103 of, for each image frame of the video, fusing the first feature vector of each visual target and the identification information of the image frame to which the visual target belongs to generate the second feature vector of each visual target is performed after execution of S102 of generating the first feature vector of each visual target. In this embodiment, the identification information of the image frame to which the visual target belongs is used for recording the image frame to which each visual target belongs and relative positions between the frames.

In the determination of initiation of the active interaction, besides discovery of the interested interaction object, it is required to be determined according to behaviors of the interaction object in a past period, and therefore, behavior features of the same interaction object in the past period should be extracted.

In this embodiment, when S102 is executed, a self-attention mechanism may be introduced to spatially and temporally model the visual target in the image frame, so as to fuse temporal information and spatial information of the visual target to obtain the second feature vector corresponding to the visual target, and the obtained second feature vector includes historical behavior features of the visual target.

In this embodiment, during execution of S103 of fusing the first feature vector of each visual target and the identification information of the image frame to which the visual target belongs to generate the second feature vector of each visual target, an employed optional implementation may include: for each image frame in the video, inputting the first feature vector of the visual target and the identification information of the image frame to which the visual target belongs into a pre-created neural network model, and the neural network model includes a plurality of decoder blocks, and each decoder block includes a self-attention layer and a feed-forward layer; and taking an output result of the neural network model as the second feature vector of the visual target.

In this embodiment, the self-attention layer calculates an attention value using the following formula:

$$\text{Attention}(Q, K, V) = \text{soft max}\left(\frac{QK^T}{\sqrt{d_k}}\right)V$$

where Attention (Q,K,V) represents the calculated attention value; Q, K and V are equal and are input vectors formed by the first feature vector and the identification information of the image frame; and $d_k$ represents the number of dimensions of the input vector. Therefore, in this embodiment, after the self-attention layer in the decoder block obtains the attention value of the input vector using the above-mentioned calculation formula, the attention value is passed by the feed-forward layer to a self-attention layer in the next decoder block for calculation, this process continues, and the output of the feed-forward layer in the last decoder block is taken as the second feature vector of the visual target.

In this embodiment, S104 of aggregating the second feature vectors with the same identification information respectively to generate the third feature vector corresponding to each image frame is performed after execution of S103 of generating the second feature vector of each visual target.

In other words, in S104 in this embodiment, the second feature vectors of the visual targets belonging to a same image frame are put into one group, and are aggregated by means of a max pooling operation, thereby obtaining the third feature vector corresponding to each image frame.

In this embodiment, S105 of determining whether the active interaction is performed according to the third feature vector of the preset image frame and initiating the active interaction in response to determining that the active interaction is to be performed is executed after execution of S104 of generating the third feature vector corresponding to each image frame.

In this embodiment, for an example, the preset image frame involved in S105 may be any image frame in the acquired video; for another example, a sliding window may be set, and the last image frame in the sliding window is used as the preset image frame, for example, if the sliding window includes 20 image frames, the preset image frame is the last image frame in the sliding window.

In this embodiment, during execution of S105 of determining to perform the active interaction according to the third feature vector of the preset image frame, an employed optional implementation may include: inputting the third feature vector of the preset image frame into a pre-trained first discriminant model; and determining whether the active interaction is to be performed according to an output result of the first discriminant model, for example, if the discriminant model outputs 'yes', determining to perform the active interaction, and if the discriminant model outputs 'no', determining not to perform the active interaction.

It may be understood that the first discriminant model used in S105 in this embodiment may output a discriminant result of whether to perform the active interaction according to the input feature vector.

With the above-mentioned method according to this embodiment, the intelligent robot fully analyzes the interaction intention of the interaction object by analyzing the visual information of the interaction object and performing a spatial-temporal modeling operation on the interaction object, thereby improving the intelligence and accuracy of the active interaction.

Figure 2:
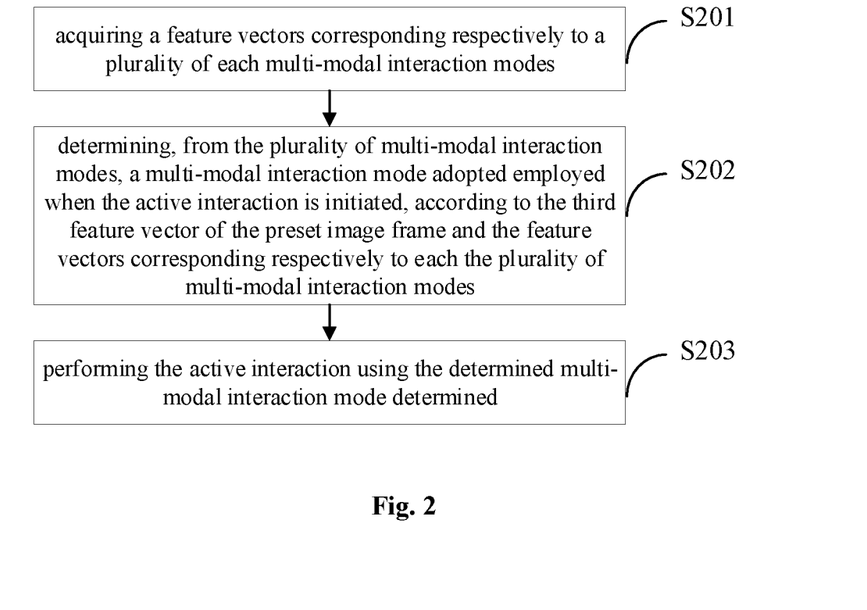
FIG. 2 is a schematic diagram according to a second embodiment of the present disclosure.

FIG. 2 is a schematic diagram according to a second embodiment of the present disclosure. As shown in FIG. 2, in this embodiment, the execution of S105 of initiating the active interaction may include the following steps:

S201: acquiring feature vectors corresponding respectively to a plurality of multi-modal interaction modes;

S202: determining from the plurality of multi-modal interaction modes, a multi-modal interaction mode to be employed when the active interaction is initiated, according to the third feature vector of the preset image frame and the feature vectors corresponding respectively to the plurality of multi-modal interaction modes; and S203: performing the active interaction using the multi-modal interaction mode determined.

The multi-modal interaction modes involved in this embodiment include an interaction language, an interaction expression and an interaction action used when the intelligent robot interacts with the interaction object, and different multi-modal interaction modes include different interaction languages, interaction expressions, or interaction actions.

The feature vectors corresponding respectively to the plurality of multi-modal interaction modes acquired in S201 in this embodiment is obtained by: acquiring a semantic vector for characterizing each interaction statement by a pre-trained language model, for example, an ERNIE pre-trained language model; acquiring one-hot codes for characterizing each interaction expression and each interaction action respectively; constructing different multi-modal interaction modes using different interaction languages, interaction expressions and interaction actions; and splicing the semantic vector and the one-hot codes corresponding to each multi-modal interaction mode, and inputting the splicing result into a fully-connected network, and taking an output result as the feature vector corresponding to each multi-modal interaction mode.

In this embodiment, during execution of S202 of determining, from the plurality of multi-modal interaction modes, the multi-modal interaction mode employed when the active interaction is initiated according to the third feature vector of the preset image frame and the feature vectors corresponding respectively to the plurality of multi-modal interaction modes, an employed optional implementation may include: multiplying the third feature vector of the preset image frame respectively by the feature vectors corresponding respectively to the plurality of multi-modal interaction modes, and inputting the multiplication results into a pre-trained second discriminant model; and determining the multi-modal interaction mode employed when the active interaction is initiated according to an output result of the second discriminant model; in other words, the second discriminant model may output a score of each multi-modal interaction mode in a current scenario according to the input, so as to select the multi-modal interaction mode with a higher score for the active interaction.

It may be understood that the second discriminant model used in S202 in this embodiment may output the score of each multi-modal interaction mode according to the input feature vector.

With the above-mentioned method according to this embodiment, when initiating the active interaction, the intelligent robot may select the multi-modal interaction mode conforming to the current scenario, such that the initiated active interaction is more exquisite and closer to social interaction between people, thereby improving the intelligence of the active interaction.

Figure 3:
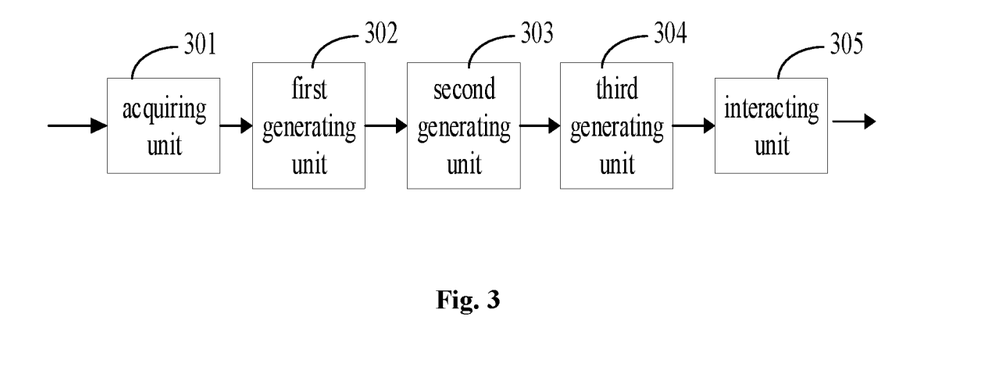
FIG. 3 is a schematic diagram according to a third embodiment of the present disclosure.

FIG. 3 is a schematic diagram according to a third embodiment of the present disclosure. As shown in FIG. 3, an active interaction apparatus according to this embodiment is located in the intelligent robot and includes:

an acquiring unit 301 configured for acquiring a video shot in real time;

a first generating unit 302 configured for extracting a visual target from each image frame of the video, and generating a first feature vector of each visual target;

a second generating unit 303 configured for, for each image frame of the video, fusing the first feature vector of each visual target and identification information of the image frame to which the visual target belongs to generate a second feature vector of each visual target;

a third generating unit 304 configured for aggregating the second feature vectors with the same identification information respectively to generate a third feature vector corresponding to each image frame; and an interacting unit 304 configured for initiating active interaction in response to determining that the active interaction is to be performed according to the third feature vector of a preset image frame.

When the acquiring unit 301 acquires the video shot in real time, the intelligent robot may acquire the video shot in real time by a camera carried by the intelligent robot, or by another camera.

The first generating unit 302 extracts the visual targets from the image frames contained in the video and generates the first feature vector corresponding to each visual target after the acquiring unit 301 acquires the video shot in real time. The visual targets extracted from the image frames by the first generating unit 302 are specific targets in the image frames, and include a person, a backpack, a luggage case and a mobile phone in the image frames.

It is to be understood that, in order to reduce the complexity of a calculation process, in this embodiment, when extracting the visual target from each image frame of the video, the first generating unit 302 may set the number of the extracted visual targets, for example, extract two visual targets from each image frame.

Specifically, when the first generating unit 302 extracts the visual target from each image frame of the video and generates the first feature vector of each visual target, an employed optional implementation may include: annotating the visual target according to a feature map of each image frame; extracting a feature-map sub-region corresponding to the visual target from the feature map, and converting the feature-map sub-region into a sub-feature-map with the same size; after a GAP operation is performed on each sub-feature-map, obtaining the first feature vector corresponding to each visual target.

After a picture region of the visual target is represented as the sub-feature-map, position and size information of the visual target in the image frame may be lost. Therefore, in order to avoid the loss of the above-mentioned information, after the first generating unit 302 generates the first feature vector of each visual target, the implementation may further include: for each visual target, determining its coordinates at the upper left corner (Xmin, Ymin) and its coordinates at the lower right corner (Xmax, Ymax) in the image frame in a two-dimensional coordinate system with a center of the image frame as an origin; after a plurality of points are selected from the range [Xmin, Xmax] and [Ymin, Ymax] corresponding to each visual target in the image frame, establishing positional representation of each visual target in a two-dimensional plane; flattening the established positional representation into a position feature vector with a preset number of dimensions, and then splicing the position feature vector with the first feature vector of the visual target.

The second generating unit 303, for each image frame of the video, fuses the first feature vector of each visual target and the identification information of the image frame to which the visual target belongs to generate the second feature vector of each visual target after the first generating unit 302 generates the first feature vector of each visual target. In the second generating unit 303, the identification information of the image frame to which the visual target belongs is used for recording the image frame to which each visual target belongs and relative positions between the frames.

In the determination of initiation of the active interaction, besides discovery of the interested interaction object, it is required to be determined according to behaviors of the interaction object in a past period, and therefore, behavior features of the same interaction object in the past period should be extracted.

The second generating unit 303 may introduce a self-attention mechanism to spatially and temporally model the visual target in the image frame, so as to fuse temporal information and spatial information of the visual target to obtain the second feature vector corresponding to the visual target, and the obtained second feature vector includes historical behavior features of the visual target.

When the second generating unit 303 fuses the first feature vector of each visual target and the identification information of the image frame to which the visual target belongs to generate the second feature vector of each visual target, an employed optional implementation may include: for each image frame in the video, inputting the first feature vector of the visual target and the identification information of the image frame to which the visual target belongs into a pre-created neural network model, and the neural network model includes a plurality of decoder blocks, and each decoder block includes a self-attention layer and a feed-forward layer; and taking an output result of the neural network model as the second feature vector of the visual target.

In the second generating unit 303, the self-attention layer calculates an attention value using the following formula:

$$\text{Attention}(Q, K, V) = \text{soft max}\left(\frac{QK^T}{\sqrt{d_k}}\right)V$$

where Attention (Q,K,V) represents the calculated attention value; Q, K and V are equal and are input vectors formed by the first feature vector and the identification information of the image frame; and $d_k$ represents the number of dimensions of the input vector. Therefore, in the second generating unit 303, after the self-attention layer in the decoder block obtains the attention value of the input vector using the above-mentioned calculation formula, the attention value is passed by the feed-forward layer to a self-attention layer in the next decoder block for calculation, this process continues, and the output of the feed-forward layer in the last decoder block is taken as the second feature vector of the visual target.

The third generating unit 304 aggregates the second feature vectors with the same identification information respectively to generate the third feature vector corresponding to each image frame after the second generating unit 303 generates the second feature vector of each visual target.

That is, the third generating unit 304 takes the second feature vectors of the visual targets belonging to a same image frame are put into one group, and aggregates these second feature vectors by means of a max pooling operation, thereby obtaining the third feature vector corresponding to each image frame.

The interacting unit 305 determines whether the active interaction is performed according to the third feature vector of the preset image frame and initiates the active interaction in response to determining that the active interaction is determined to be performed after the third generating unit 304 generates the third feature vector corresponding to each image frame.

The preset image frame involved in the interacting unit 305, for example, is any image frame in the acquired video; for another example, a sliding window may be set, and the last image frame in the sliding window is used as the preset image frame, for example, if the sliding window includes 20 image frames, the preset image frame is the last image frame in the sliding window.

When the interacting unit 305 determines to perform the active interaction according to the third feature vector of the preset image frame, an employed optional implementation may include: inputting the third feature vector of the preset image frame into a pre-trained first discriminant model; and determining whether the active interaction is to be performed according to an output result of the first discriminant model, for example, if the discriminant model outputs 'yes', determining to perform the active interaction, and if the discriminant model outputs 'no', determining not to perform the active interaction.

It may be understood that the first discriminant model used in the interacting unit 305 may output a discriminant result of whether to perform the active interaction according to the input feature vector.

When the interacting unit 305 performs the active interaction, an employed optional implementation may include: acquiring feature vectors corresponding respectively to a plurality of multi-modal interaction modes; determining, from the plurality of multi-modal interaction modes, a multi-modal interaction mode to be employed when the active interaction is initiated, according to the third feature vector of the preset image frame and the feature vectors corresponding respectively to the plurality of multi-modal interaction modes; and performing the active interaction using the multi-modal interaction mode determined.

When the interacting unit 305 acquires the feature vector corresponding to each multi-modal interaction mode, an employed optional implementation may include: acquiring a semantic vector for characterizing each interaction statement by a pre-trained language model; acquiring one-hot codes for characterizing each interaction expression and each interaction action respectively; constructing different multi-modal interaction modes using different interaction languages, interaction expressions and interaction actions; and splicing the semantic vector and the one-hot codes corresponding to each multi-modal interaction mode, and inputting the splicing result into a fully-connected network, and taking an output result as the feature vector corresponding to each multi-modal interaction mode.

When the interacting unit 305 determines, from the plurality of multi-modal interaction modes, the multi-modal interaction mode employed when the active interaction is initiated according to the third feature vector of the preset image frame and the feature vectors corresponding respectively to the plurality of multi-modal interaction modes, an employed optional implementation may include: multiplying the third feature vector of the preset image frame respectively by the feature vectors corresponding respectively to the plurality of multi-modal interaction modes, and inputting the multiplication results into a pre-trained second discriminant model; and determining the multi-modal interaction mode employed when the active interaction is initiated according to an output result of the second discriminant model; in other words, the second discriminant model may output a score of each multi-modal interaction mode in a current scenario according to the input, so as to select the multi-modal interaction mode with a higher score for the active interaction.

It may be understood that the second discriminant model used in the interacting unit 305 may output the score of each multi-modal interaction mode according to the input feature vector.

According to the embodiments of the present disclosure, there are also provided an electronic device and a computer readable storage medium.

Figure 4:
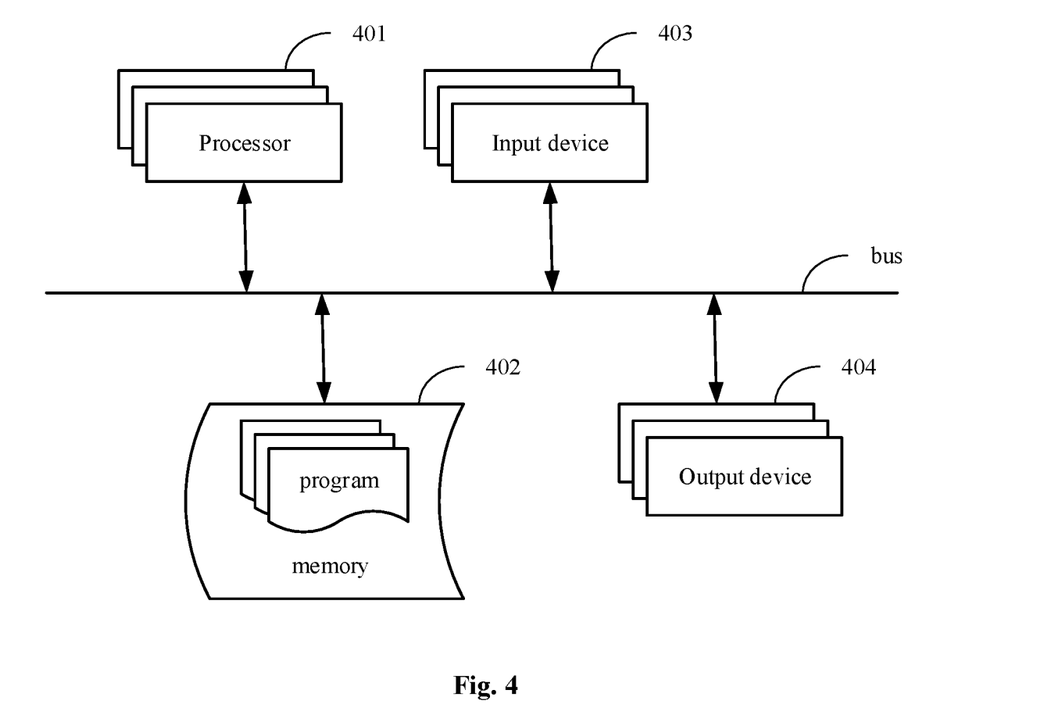
FIG. 4 is a block diagram of an electronic device configured to implement an active interaction method according to an embodiment of the present disclosure.

FIG. 4 is a block diagram of an electronic device for the active interaction method according to an embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile devices, such as personal digital processors, cellular telephones, smart phones, wearable devices, and other similar computing devices. The components shown herein, their connections and relationships, and their functions, are meant to be exemplary only, and are not meant to limit implementation of the present disclosure described and/or claimed herein.

As shown in FIG. 4, the electronic device includes one or more processors 401, a memory 402, and interfaces configured to connect the components, including high-speed interfaces and low-speed interfaces. The components are interconnected using different buses and may be mounted at a common motherboard or in other manners as desired. The processor may process instructions for execution within the electronic device, including instructions stored in or at the memory to display graphical information for a GUI at an external input/output device, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 4, one processor 401 is taken as an example.

The memory 402 is configured as the non-transitory computer readable storage medium according to the present disclosure. The memory stores instructions, which when executed by the at least one processor, cause the at least one processor to perform an active interaction method according to the present disclosure. The non-transitory computer readable storage medium according to the present disclosure stores computer instructions for causing a computer to perform the active interaction method according to the present disclosure.

The memory 402 which is a non-transitory computer readable storage medium may be configured to store non-transitory software programs, non-transitory computer executable programs and modules, such as program instructions/modules corresponding to the active interaction method according to the embodiment of the present disclosure (for example, the acquiring unit 301, the first generating unit 302, the second generating unit 303, the third generating unit 304 and the interacting unit 305 shown in FIG. 3). The processor 401 executes various functional applications and data processing of a server, that is, implements the active interaction method according to the above-mentioned embodiment, by running the non-transitory software programs, instructions, and modules stored in the memory 402.

The memory 402 may include a program storage area and a data storage area, and the program storage area may store an operating system and an application program required for at least one function; the data storage area may store data created according to use of the electronic device, or the like. Furthermore, the memory 402 may include a high-speed random access memory, or a non-transitory memory, such as at least one magnetic disk storage device, a flash memory device, or other non-transitory solid state storage devices. In some embodiments, optionally, the memory 402 may include memories remote from the processor 401, and such remote memories may be connected to the electronic device for the active interaction method via a network. Examples of such a network include, but are not limited to, the Internet, intranets, local area networks, mobile communication networks, and combinations thereof.

The electronic device for the active interaction method may further include an input device 403 and an output device 404. The processor 401, the memory 402, the input device 403 and the output device 404 may be connected by a bus or other means, and FIG. 4 takes the connection by a bus as an example.

The input device 403 may receive input numeric or character information and generate key signal input related to user settings and function control of the electronic device for the active interaction method, such as a touch screen, a keypad, a mouse, a track pad, a touch pad, a pointing stick, one or more mouse buttons, a trackball, a joystick, or the like. The output device 404 may include a display device, an auxiliary lighting device (for example, an LED) and a tactile feedback device (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, application specific integrated circuits (ASIC), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmitting data and instructions to, a storage system, at least one input device, and at least one output device.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLD)) for providing machine instructions and/or data for a programmable processor, including a machine readable medium which receives machine instructions as a machine readable signal. The term "machine readable signal" refers to any signal for providing machine instructions and/or data for a programmable processor.

To provide interaction with a user, the systems and technologies described here may be implemented on a computer having: a display device (for example, a cathode ray tube (CRT) or liquid crystal display (LCD) monitor) for displaying information to a user; and a keyboard and a pointing device (for example, a mouse or a trackball) by which a user may provide input for the computer. Other kinds of devices may also be used to provide interaction with a user; for example, feedback provided for a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other.

With the technical solution according to the embodiment of the present disclosure, the interaction intention of the interaction object is fully analyzed by analyzing the visual information of the interaction object and performing a spatial-temporal modeling operation on the interaction object, thereby improving the intelligence and accuracy of the active interaction.

An embodiment of the above-mentioned disclosure has the following advantages or beneficial effects: with the technical solution, the accuracy and intelligence of active interaction may be improved. Adoption of the technical means of analyzing an interaction intention of an interaction object by analyzing visual information of the interaction object and performing a spatial-temporal modeling operation on the interaction object, overcomes the technical problem of low accuracy and intelligence caused by triggering the active interaction only by simple interaction logic in the prior art, and achieves a technical effect of improving the accuracy and intelligence of the active interaction.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. An active interaction method, comprising:
acquiring a video shot in real time;
extracting a visual target from each image frame of the video, and generating a first feature vector of each visual target;
for each image frame of the video, fusing the first feature vector of each visual target and identification information of the image frame to which the visual target belongs, to generate a second feature vector of each visual target;
aggregating the second feature vectors with the same identification information respectively to generate a third feature vector corresponding to each image frame; and initiating active interaction between an intelligent device and its surroundings in response to determining that the active interaction is to be performed according to the third feature vector of a preset image frame.

2. The method according to claim 1, wherein extracting the visual target from each image frame of the video comprises:
    extracting a specific target from each image frame of the video as the visual target.

3. The method according to claim 1, wherein extracting the visual target from each image frame of the video, and generating the first feature vector of each visual target comprises:
    annotating the visual target according to a feature map of each image frame;
    extracting a feature-map sub-region corresponding to the visual target from the feature map, and converting the feature-map sub-region into a sub-feature-map with a preset size; and
    performing a global average pooling operation on each sub-feature-map, so as to obtain the first feature vector corresponding to each visual target.

4. The method according to claim 3, further comprising:
    after the first feature vector of each visual target is obtained, for each visual target, determining its coordinates at the upper left corner and its coordinates at the lower right corner in the image frame in a two-dimensional coordinate system with a center of the image frame as an origin;
    selecting a plurality of points from a range limited by the coordinates corresponding to each visual target in the image frame, so as to establish positional representation of each visual target in a two-dimensional plane; and
    flattening the established positional representation into a position feature vector with a preset number of dimensions, and then splicing the position feature vector with the first feature vector of each visual target.

5. The method according to claim 1, wherein for each image frame of the video, fusing the first feature vector of each visual target and identification information of the image frame to which the visual target belongs to generate a second feature vector of each visual target comprises:
    for each image frame in the video, inputting the first feature vector of the visual target and the identification information of the image frame to which the visual target belongs into a pre-created neural network model; and
    taking an output result of the neural network model as the second feature vector of the visual target,
    wherein the neural network model comprises a plurality of decoder blocks, and each decoder block comprises a self-attention layer and a feed-forward layer.

6. The method according to claim 1, wherein initiating active interaction comprises:
    acquiring feature vectors corresponding respectively to a plurality of multi-modal interaction modes;
    determining, from the plurality of multi-modal interaction modes, a multi-modal interaction mode to be employed when the active interaction is initiated, according to the third feature vector of the preset image frame and the feature vectors corresponding respectively to the plurality of multi-modal interaction modes; and
    performing the active interaction using the multi-modal interaction mode determined.

7. The method according to claim 6, wherein acquiring the feature vectors corresponding respectively to the plurality of multi-modal interaction modes comprises:
    acquiring a semantic vector for characterizing each interaction statement by a pre-trained language model;
    acquiring one-hot codes for characterizing each interaction expression and each interaction action respectively;
    constructing different multi-modal interaction modes using different interaction languages, interaction expressions and interaction actions; and
    splicing the semantic vector and the one-hot codes corresponding to each multi-modal interaction mode, and inputting the splicing result into a fully-connected network, and taking an output result as the feature vector corresponding to each multi-modal interaction mode.

8. The method according to claim 6, wherein the determining, from the plurality of multi-modal interaction modes, the multi-modal interaction mode employed when the active interaction is initiated according to the third feature vector of the preset image frame and the feature vectors corresponding respectively to the plurality of multi-modal interaction modes comprises:
    multiplying the third feature vector of the preset image frame respectively by the feature vectors corresponding respectively to the plurality of multi-modal interaction modes, and inputting the multiplication results into a pre-trained second discriminant model; and
    determining the multi-modal interaction mode employed when the active interaction is initiated according to an output result of the second discriminant model.

9. An electronic device, comprising:
    at least one processor;
    a memory connected with the at least one processor communicatively;
    wherein the memory stores instructions executable by the at least one processor to enable the at least one processor to carry out an active interaction method, which comprises:
    acquiring a video shot in real time;
    extracting a visual target from each image frame of the video, and generating a first feature vector of each visual target;
    for each image frame of the video, fusing the first feature vector of each visual target and identification information of the image frame to which the visual target belongs, to generate a second feature vector of each visual target;
    aggregating the second feature vectors with the same identification information respectively to generate a third feature vector corresponding to each image frame; and
    initiating active interaction between an intelligent device and its surroundings in response to determining that the active interaction is to be performed according to the third feature vector of a preset image frame.

10. The electronic device according to claim 9, wherein extracting the visual target from each image frame of the video comprises:
    extracting a specific target from each image frame of the video as the visual target.

11. The electronic device according to claim 9, wherein extracting the visual target from each image frame of the video, and generating the first feature vector of each visual target comprises:

annotating the visual target according to a feature map of each image frame;

extracting a feature-map sub-region corresponding to the visual target from the feature map, and converting the feature-map sub-region into a sub-feature-map with a preset size; and performing a global average pooling operation on each sub-feature-map, so as to obtain the first feature vector corresponding to each visual target.

12. The electronic device according to claim 11, wherein the method further comprises:

after the first feature vector of each visual target is obtained, for each visual target, determining its coordinates at the upper left corner and its coordinates at the lower right corner in the image frame in a two-dimensional coordinate system with a center of the image frame as an origin;

selecting a plurality of points from a range limited by the coordinates corresponding to each visual target in the image frame, so as to establish positional representation of each visual target in a two-dimensional plane; and flattening the established positional representation into a position feature vector with a preset number of dimensions, and then splicing the position feature vector with the first feature vector of each visual target.

13. The electronic device according to claim 9, wherein for each image frame of the video, fusing the first feature vector of each visual target and identification information of the image frame to which the visual target belongs to generate a second feature vector of each visual target comprises:

for each image frame in the video, inputting the first feature vector of the visual target and the identification information of the image frame to which the visual target belongs into a pre-created neural network model; and taking an output result of the neural network model as the second feature vector of the visual target, wherein the neural network model comprises a plurality of decoder blocks, and each decoder block comprises a self-attention layer and a feed-forward layer.

14. The electronic device according to claim 9, wherein initiating active interaction comprises:

acquiring feature vectors corresponding respectively to a plurality of multi-modal interaction modes;

determining, from the plurality of multi-modal interaction modes, a multi-modal interaction mode to be employed when the active interaction is initiated, according to the third feature vector of the preset image frame and the feature vectors corresponding respectively to the plurality of multi-modal interaction modes; and performing the active interaction using the multi-modal interaction mode determined.

15. The electronic device according to claim 14, wherein acquiring the feature vectors corresponding respectively to the plurality of multi-modal interaction modes comprises:

acquiring a semantic vector for characterizing each interaction statement by a pre-trained language model;

acquiring one-hot codes for characterizing each interaction expression and each interaction action respectively;

constructing different multi-modal interaction modes using different interaction languages, interaction expressions and interaction actions; and splicing the semantic vector and the one-hot codes corresponding to each multi-modal interaction mode, and inputting the splicing result into a fully-connected network, and taking an output result as the feature vector corresponding to each multi-modal interaction mode.

16. The electronic device according to claim 14, wherein the determining, from the plurality of multi-modal interaction modes, the multi-modal interaction mode employed when the active interaction is initiated according to the third feature vector of the preset image frame and the feature vectors corresponding respectively to the plurality of multi-modal interaction modes comprises:

multiplying the third feature vector of the preset image frame respectively by the feature vectors corresponding respectively to the plurality of multi-modal interaction modes, and inputting the multiplication results into a pre-trained second discriminant model; and determining the multi-modal interaction mode employed when the active interaction is initiated according to an output result of the second discriminant model.

17. A non-transitory computer readable storage medium comprising instructions, which, when executed by a computer, cause the computer to carry out an active interaction method, which comprises:

acquiring a video shot in real time;

extracting a visual target from each image frame of the video, and generating a first feature vector of each visual target;

for each image frame of the video, fusing the first feature vector of each visual target and identification information of the image frame to which the visual target belongs, to generate a second feature vector of each visual target;

aggregating the second feature vectors with the same identification information respectively to generate a third feature vector corresponding to each image frame; and initiating active interaction between an intelligent device and its surroundings in response to determining that the active interaction is to be performed according to the third feature vector of a preset image frame.

18. The non-transitory computer readable storage medium according to claim 17, wherein extracting the visual target from each image frame of the video, and generating the first feature vector of each visual target comprises:

annotating the visual target according to a feature map of each image frame;

extracting a feature-map sub-region corresponding to the visual target from the feature map, and converting the feature-map sub-region into a sub-feature-map with a preset size; and performing a global average pooling operation on each sub-feature-map, so as to obtain the first feature vector corresponding to each visual target.

19. The non-transitory computer readable storage medium according to claim 18, wherein the method further comprises:

after the first feature vector of each visual target is obtained, for each visual target, determining its coordinates at the upper left corner and its coordinates at the lower right corner in the image frame in a two-dimensional coordinate system with a center of the image frame as an origin;

selecting a plurality of points from a range limited by the coordinates corresponding to each visual target in the image frame, so as to establish positional representation of each visual target in a two-dimensional plane; and flattening the established positional representation into a position feature vector with a preset number of dimensions, and then splicing the position feature vector with the first feature vector of each visual target.

20. The non-transitory computer readable storage medium according to claim 17, wherein initiating active interaction comprises:
- acquiring feature vectors corresponding respectively to a plurality of multi-modal interaction modes;
- determining, from the plurality of multi-modal interaction modes, a multi-modal interaction mode to be employed when the active interaction is initiated, according to the third feature vector of the preset image frame and the feature vectors corresponding respectively to the plurality of multi-modal interaction modes; and
- performing the active interaction using the multi-modal interaction mode determined.

* * * * *